United States Patent Office 3,849,503
Patented Nov. 19, 1974

3,849,503
DIPHENYLETHERS HAVING HERBICIDAL PROPERTIES
Itaru Shigehara, Kusatsu, Ryuyo Nishiyama, Kyoto, and Ryohei Takahashi, Kanichi Fujikawa, Tadaaki Toki, Hidetoshi Takagi, Rikuo Nasu, Isao Yokomichi, Fumio Kimura, and Shinzo Someya, Kusatsu, Japan, assignors to Ishihara Sangyo Kaisha Ltd., Nishiku, Osaka, Japan
No Drawing. Original application Oct. 14, 1970, Ser. No. 80,807. Divided and this application Dec. 21, 1972, Ser. No. 317,155
Claims priority, application Japan, Oct. 14, 1969, 44/81,971; Apr. 22, 1970, 45/33,793; May 6, 1970, 45/37,902, 45/37,903; June 5, 1970, 45/47,929
Int. Cl. C07c 43/20
U.S. Cl. 260—613 R
6 Claims

ABSTRACT OF THE DISCLOSURE

Diphenylethers have been produced having the general formula:

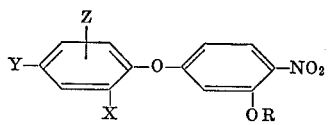

wherein X represents a halogen atom or a methyl radical in the 2-position; Y represents a halogen atom or an alkyl radical having up to 3 carbons atoms in the 4-position; Z represents hydrogen or halogen in the 5- and 6-positions, wherein both the 5- and 6-positions may be hydrogen, but only one of the 5- or 6-positions may be halogen; and R represents a saturated or an unsaturated hydrocarbon, having up to 3 carbon atoms, or a methoxyethyl or ethoxyethyl radical. These compounds have This is a division of application Ser. No. 80,807, filed Oct. 14, 1970.

BACKGROUND OF THE INVENTION

Field of the invention

This invention relates to novel diphenylethers, to herbicide products made from said diphenylethers, and further to new processes for producing the same.

Description of the prior art

It has been known that various diphenylether compounds including 2,4 - dichloro - 4' - nitrodiphenylether (TOK), 2,4,6 - trichloro - 4' - nitrodiphenylether (MO) exhibit herbicidal properties. Many other diphenylethers, however, having similar chemical structures as TOK and MO, have been found to have no herbicidal effects, and hence it has been presumed that the herbicidal properties are not dependent upon the diphenylether chemical formula alone. Although various studies have been made for been found to be useful as herbicides.
diphenylethers having 4' - nitrophenyl - radicals, very few of such compounds investigated to date have been found to exhibit herbicidal properties.

Summary of the invention

Accordingly, it is one object of this invention to provide a novel genus of diphenylethers.
It is another object of this invention to provide a novel process for producing said diphenylethers.
It is another object of this invention to provide a herbicide which will inhibit weed growth, yet which will not harm warm-blooded animals, such as man or domestic animals, nor injure agricultural products.

A still further object of this invention is to provide a herbicide which will inhibit weed growth and particularly weed growth in wet lands, such as rice paddies and the like, yet which is harmless to agricultural products.
These and other objects have now herein been attained by the discovery that the substitution of a saturated or unsaturated alkoxy radical in the 3'-position of the benzene ring of a 4'-nitrophenyl radical will provide a remarkably effective herbicidal compound. In particular, it has been found that the novel diphenylethers of the following general formula possess remarkable herbicidal properties:

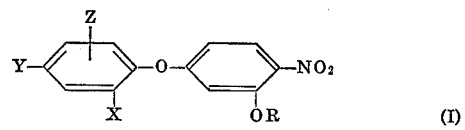
(I)

wherein X represents a halogen atom or a methyl radical in 2-position; Y represents a halogen atom or an alkyl radical having up to 3 carbon atoms in 4-position; Z represents hydrogen or halogen in the 5- and 6-positions, wherein both the 5- and 6-positions may be hydrogen, but only one of the 5- or 6-positions may be halogen; and R represents a saturated or an unsaturated hydrocarbon, having up to 3 carbon atoms, or a methoxyethyl or ethoxyethyl radical.

DETAILED DESCRIPTION OF PREFERRED EMBODIMENTS

Illustrative of some of the diphenylethers within the genus of formula (I) include 2,4 - dichloro - 3' - methoxy - 4' - nitrodiphenylether, 2,4 - dichloro - 3' - ethoxy-4' - nitrodiphenylether, 2 - chloro - 4 - methyl - 3' - methoxy - 4' - nitrodiphenylether, 2 - chloro - 4 - methyl - 4'-ethoxy - 4' - nitrodiphenylether, all of which have been found to possess remarkably good herbicidal properties. It has been found that if the other phenyl radical is 3-chlorophenyl, 3 - methylphenyl or 3,5 - dimethylphenyl, such as 3 - chloro - 3' - methoxy - 4 - nitrodiphenylether, 3 - chloro - 3' - ethoxy - 4' - nitrodiphenylether, 3 - methyl - 3' - methoxy - 4' - nitrodiphenylether, 3 - methyl-3' - iso - propoxy - 4' - nitrodiphenylether, 3,5 - dimethyl - 3' - methoxy - 4' - nitrodiphenylether, 3,5 - dimethyl-3' - n - propoxy - 4' - nitrodiphenylether, the substitution of the —OR group at the 3'-position of the benzene ring in the 4'-nitrophenyl radical will result in decreased herbicidal effects. Moreover, it has been found that the substitution of an —OR grouping in the 2'-position of the benzene ring in the 4'-nitrophenyl radical, such as 2,4-dichloro - 2' - methoxy - 4' - nitrodiphenylether, or the substitution of a —NO₂ group in the 3'-position of the benzene ring in the 4'-nitrophenyl radical such as 2,4-dichloro-3',4'-dinitrodiphenylether, will result in compounds having no herbicidal properties.
Furthermore, it has been found that diphenylethers having 3'-(OR-substituted)-4'-nitrophenyl radical having another substituent such as 2,4-dichloro-3',6'-dimethoxy-4'-nitro diphenylether, 2,4-dichloro-3'-methoxy-4'-nitro-6'-chloro diphenylether, 2-chloro-4-methyl-3',6'-dimethoxy-4'-nitro diphenylether, 2-methyl-4-chloro-3',6'-dimethoxy-4'-nitro diphenylether, 2,4 - dimethyl-3',6'-dimethoxy-4'-nitro diphenylether, 2,4,5-trichloro-3',6'-dimethoxy-4'-nitro diphenylether, also exhibit little or no herbicidal properties.
In said diphenylethers having formula (I), if OR in 3'-position is substituted by halogen, alkyl, alkylthio, alkylamino or fluoromethyl radical, the advantages of herbicidal properties of the compound are less than those of the compound having the general formula (I).
In accordance with this invention, it has now been found that the novel diphenylethers having the general formula (I) possess remarkably good herbicidal properties. The following compounds are representative of diphenylethers of this invention: Compounds 9, 10, 11, 12, 38, 42, 43, 49, 56, 65 and 66 are included in this list as being representative of analogous compounds which have been used as controls. Accordingly, these eleven compounds are not within the scope of the present invention.

| Compound number | Chemical structure | Physical property |
|---|---|---|
| 1 | 2,4-dichloro-3'-methoxy-4'-nitrodiphenylether. | (M.P. 112-114° C.). |
| 2 | 2,4-dichloro-3'-ethoxy-4'-nitrodiphenylether. | (M.P. 102-104° C.). |
| 3 | 2,4-dichloro-3'-n-propoxy-4'-nitrodiphenylether. | (M.P. 70-72° C.). |
| 4 | 2,4-dichloro-3'-iso-propoxy-4'-nitrodiphenylether. | (M.P. 82-83° C.). |
| 5 | 2,4-dichloro-3'-(2-propenyloxy)-4'-nitrodiphenylether. | (M.P. 71-74° C.). |
| 6 | 2,4-dichloro-3'-(2-propynyloxy)-4'-nitrodiphenylether. | (M.P. 89-91° C.). |
| 7 | 2,4-dichloro-3'-methoxyethoxy-4'-nitrodiphenylether. | (M.P. 62-63° C.). |
| 8 | 2,4-dichlror-3'-ethoxyethoxy-4'-nitrodiphenylether. | (Liquid). |
| 9* | 2,4-dichloro-2'-methoxy-4'-nitrodiphenylether. | Outside scope of invention.* |
| 10* | 2,4-dichloro-3',4'-dinitrodiphenylether. | Do. |
| 11* | 2,4-dichloro-3',6'-dimethoxy-4'-nitrodiphenylether. | Do. |
| 12* | 2,4-dichloro-3'-methoxy-4'-nitro-6'-chlorodiphenylether. | Do. |
| 13 | 2-chloro-4-fluoro-3'-methoxy-4'-nitro diphenylether. | (M.P. 110-112° C.). |
| 14 | 2-chloro-4-fluoro-3'-ethoxy-4'-nitrodiphenylether. | (M.P. 103-104° C.). |
| 15 | 2-chloro-4-bromo-3'-methoxy-4'-nitrodiphenylether. | (M.P. 115-117° C.). |
| 16 | 2-chloro-4-bromo-3'-ethoxy-4'-nitrodiphenylethers | (M.P. 85-87° C.). |
| 17 | 2-chloro-4-bromo-3'-n-propoxy-4'-nitrodiphenylether. | (M.P. 73.5-75° C.). |
| 18 | 2-chloro-4-bromo-3'-iso-propoxy-4'-nitrodiphenylether. | (M.P. 72.5-74.5° C.). |
| 19 | 2-fluoro-4-chloro-3'-methoxy-4'-nitrodiphenylether. | (M.P. 96-97.5° C.). |
| 20 | 2-fluoro-4-chloro-3'-ethoxy-4'-nitrodiphenylether. | (M.P. 91-92° C.). |
| 21 | 2,4-difluoro-3'-methoxy-4'-nitrodiphenylether. | (M.P. 77-83° C.). |
| 22 | 2,4-difluoro-3'-ethoxy-4'-nitrodiphenylether. | (M.P. 79-81° C.). |
| 23 | 2,4-difluoro-3'-iso-propoxy-4'-nitrodiphenylether. | (Liquid). |
| 24 | 2-fluoro-4-bromo-3'-methoxy-4'-nitrodiphenylether. | (M.P. 99-102° C.). |
| 25 | 2-fluoro-4-bromo-3'-ethoxy-4'-nitrodiphenylether. | (M.P. 75-76° C.). |
| 26 | 2-bromo-4-chloro-3'-methoxy-4'-nitrodiphenylether. | (M.P. 108-109° C.). |
| 27 | 2-bromo-4-chloro-3'-ethoxy-4'-nitrodiphenylether. | (M.P. 96-97° C.). |
| 28 | 2-bromo-4-chloro-3'-n-propoxy-4'-nitrodiphenylether. | (M.P. 69.5-71° C.). |
| 29 | 2-bromo-4-chloro-3'-iso-propoxy-4'-nitrodiphenylether. | (M.P. 69-71° C). |
| 30 | 2-bromo-4-fluoro-3'-methoxy-4'-nitrodiphenylether. | (M.P. 109-111° C.). |
| 31 | 2-bromo-4-fluoro-3'-ethoxy-4'-nitrodiphenylether. | (M.P. 105-108° C.). |
| 32 | 2,4-dibromo-3'-methoxy-4'-nitrodiphenylether. | (M.P. 104-106° C.). |
| 33 | 2,4-dibromo-3'-ethoxy-4'-nitrodiphenylether. | (M.P. 107-108° C.). |
| 34 | 2,4-dibromo-3'-n-propoxy-4'-nitrodiphenylether. | (M.P. 77.5-79° C.). |
| 35 | 2,4-dibromo-3'-iso-propoxy-4'-nitrodiphenylether. | (M.P. 62-63.5° C.). |
| 36 | 2,4,6-trichloro-3'-methoxy-4'-nitrodiphenylether. | (M.P. 138-140° C.). |
| 37 | 2,4,6-trichloro-3'-ethoxy-4'-nitrodiphenylether. | (Solid). |
| 38* | 2,4,6-trichloro-2',4'-dinitrodiphenylether. | Outside scope of invention*. |
| 39 | 2,4,5-trichloro-3'-ethoxy-4'-nitrodiphenylether. | (M.P. 118-123° C.). |
| 40 | 2,4,5-trichloro-3'-methoxyethoxy-4'-nitrodiphenylether. | (M.P. 87-89.5° C.). |
| 41 | 2,4,5-trichloro-3'-ethoxyethoxy-4'-nitrodiphenylether. | (M.P. 118-123° C.). |
| 42* | 2,4,5-trichloro-4'-nitrodiphenylether. | Outside scope of invention.* |
| 43* | 2,4,5-trichloro-3',6'-dimethoxy-4'-nitrodiphenylether. | Do. |
| 44 | 2-methyl-4-chloro-3'-ethoxy-4'-nitrodiphenylether. | (M.P. 95-96° C.). |
| 45 | 2-methyl-4-chloro-3'-n-propoxy-4'-nitrodiphenylether. | (Liquid). |
| 46 | 2-methyl-4-chloro-3'-(2-propenyloxy)-4'-nitrodiphenylether. | (M.P. 74-75° C.). |
| 47 | 2-methyl-4-chloro-3'-methoxyethoxy 4'-nitrodiphenylether. | (M.P. 67-68° C.). |
| 48 | 2-methyl-4-chloro-3'-ethoxyethoxy-4'-nitrodiphenylether. | (B.P. 210-220° C.³ mm. Hg). |
| 49* | 2-methyl-4-chloro-3',6'-dimethoxy-4'-nitrodiphenylether. | Outside scope of invention.* |
| 50 | 2-chloro-4-methyl-3'-methoxy-4'-nitrodiphenylether. | (M.P. 98.5-99.8° C.). |
| 51 | 2-chloro-4-methyl-3'-ethoxy-4'-nitrodiphenylether. | (M.P. 94-96° C.). |
| 52 | 2-chloro-4-methyl-3'-n-propoxy-4'-nitrodiphenylether. | (Liquid). |
| 53 | 2-chloro-4-methyl-3'-(2-propenyloxy)-4'-nitrodiphenylether. | (M.P. 57-59° C.). |
| 54 | 2-chloro-4-methyl-3'-methoxyethoxy-4'-nitrodiphenylether. | (M.P. 57-58° C.). |
| 55 | 2-chloro-4-methyl-3'-ethoxyethoxy-4'-nitrodiphenylether. | (Liquid). |
| 56* | 2-chloro-4-methyl-3',6'-dimethoxy-4'-nitrodiphenylether. | Outside scope of invention.* |
| 57 | 2-fluoro-4-methyl-3'-methoxy-4'-nitrodiphenylether. | (M.P. 105-108° C.). |
| 58 | 2-fluoro-4-methyl-3'-ethoxy-4'-nitrodiphenylether. | (M.P. 78-79° C.). |
| 59 | 2-bromo-4-methyl-3'-methoxy-4'-nitrodiphenylether. | (M.P. 94-102° C.). |
| 60 | 2-bromo-4-methyl-3'-ethoxy-4'-nitrodiphenylether. | (M.P. 87-88.5° C.). |
| 61 | 2-chloro-4-ethyl-3'-methoxy-4'-nitrodiphenylether. | (Liquid). |
| 62 | 2-chloro-4-ethyl-3'-ethoxy-4'-nitrodiphenylether. | (M.P. 83-85° C.). |
| 63 | 2-chloro-4-iso-propyl-3'-ethoxy-4'-nitrodiphenylether. | (Liquid). |
| 64 | 2,4-dimethyl-3'-ethoxy-4'-nitrodiphenylether. | (M.P. 64-65° C.). |
| 65* | 2,4-dimethyl-4'-nitrodiphenylether | Outside scope of invention.* |
| 66* | 2,4-dimethyl-3',6'-dimethoxy-4'-nitrodiphenylether. | Do. |
| 67 | 2-methyl-4,6-dichloro-3'-methoxy-4'-nitrodiphenylether. | (M.P. 121-122° C.). |
| 68 | 2-methyl-4,6-dichloro-3'-ethoxy-4'-nitrodiphenylether. | (M.P. 95-96° C.). |
| 69 | 2-methyl-4,6-dichloro-3'-n-propoxy-4'-nitrodiphenylether. | (M.P. 96.5-98° C.) |
| 70 | 2-fluoro-4,6-dichloro-3'-ethoxy-4'-nitrodiphenylether. | (M.P. 69-71° C.). |
| 71 | 2,6-dichloro-4-methyl-3'-ethoxy-4'-nitrodiphenylether. | (M.P. 54-57° C.). |
| 72 | 2-methyl-4,6-dichloro-3'-methoxyethyl-4'-nitrodiphenylether. | (M.P. 74-75° C.). |
| 73 | 2-methyl-4,6-dichloro-3'-ethoxyethoxy-4'-nitrodiphenylether. | (B.P. 215-220° C. ³mm. Hg). |
| 74 | 2-chloro-4-ethyl-3'-n-propoxy-4'-nitrodiphenylether. | (Liquid). |
| 75 | 2-chloro-4-ethyl-3'-iso-propoxy-4'-nitrodiphenylether. | Do. |
| 76 | 2-chloro-4-iso-propyl-3'-methoxy-4'-nitrodiphenylether. | (M.P. 57-61° C.). |
| 77 | 2,6-dichloro-4-methyl-3'-methoxy-4'-nitrodiphenylether. | (M.P. 143-145° C.). |

EXPERIMENT 1

Tests for growth control of barnyard grass were made by the following method.

Pots of 1/100 m.² were filled with soil and were supersaturated with water. A specific amount of air-dried barnyard grass (*Echinochloa crusgalli* BEAUV) seed was sown in the pots and covered with soil. When the barnyard grass appeared on the ground, water was poured into each pot to a depth of 3 cm. and then an aqueous dispersion of an active ingredient of this invention was poured into the pot. Fourteen days after said treatment, each survival grass was taken up, air dried and weighed.

The results are shown in percentage by weight of grass survival of treated seed versus untreated and is indicated as "Degree of Growth."

TABLE I

| | Amount of active ingredient (g./acre) | | | |
|---|---|---|---|---|
| | 1,600 | 800 | 400 | 200 |
| | Degree of growth (percent) | | | |
| Compound number: | | | | |
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |
| 7 | 0 | 0 | 0 | 0 |
| 8 | 0 | 0 | 0 | 0 |
| 9 [1] | 100 | 100 | 100 | 100 |
| 10 [1] | 100 | 100 | 100 | 100 |
| 11 [1] | 100 | 100 | 100 | 100 |
| 12 [1] | 100 | 100 | 100 | 10 |
| 13 | 0 | 0 | 0 | 0 |
| 14 | 0 | 0 | 0 | 0 |

TABLE 1—Continued

| | Amount of active ingredient (g./acre) | | | |
|---|---|---|---|---|
| | 1,600 | 800 | 400 | 200 |
| | Degree of growth (percent) | | | |
| 15 | 0 | 0 | 0 | 0 |
| 16 | 0 | 0 | 0 | 0 |
| 17 | 0 | 0 | 0 | 0 |
| 18 | 0 | 0 | 0 | 0 |
| 19 | 0 | 0 | 0 | 0 |
| 20 | 0 | 0 | 0 | 0 |
| 21 | 0 | 0 | 0 | 22 |
| 22 | 0 | 0 | 0 | 4 |
| 23 | 0 | 0 | 0 | 9 |
| 24 | 0 | 0 | 0 | 0 |
| 25 | 0 | 0 | 0 | 0 |
| 26 | 0 | 0 | 0 | 0 |
| 27 | 0 | 0 | 0 | 0 |
| 28 | 0 | 0 | 0 | 0 |
| 29 | 0 | 0 | 0 | 0 |
| 30 | 0 | 0 | 0 | 0 |
| 31 | 0 | 0 | 0 | 0 |
| 32 | 0 | 0 | 0 | 0 |
| 33 | 0 | 0 | 0 | 0 |
| 34 | 0 | 0 | 0 | 0 |
| 35 | 0 | 0 | 0 | 0 |
| 36 | 0 | 0 | 0 | 0 |
| 37 | 0 | 0 | 0 | 0 |
| 38 [1] | 100 | 100 | 100 | 100 |
| 39 | 0 | 0 | 0 | 1 |
| 40 | 0 | 0 | 0 | 18 |
| 41 | 0 | 0 | 0 | 15 |
| 42 [1] | 100 | 100 | 100 | 100 |
| 43 [1] | 100 | 100 | 100 | 100 |
| 44 | 0 | 0 | 0 | 0 |
| 45 | 0 | 0 | 0 | 0 |
| 46 | 0 | 0 | 0 | 0 |
| 47 | 0 | 0 | 0 | 13 |
| 48 | 0 | 0 | 0 | 4 |
| 49 [1] | 100 | 100 | 100 | 106 |
| 50 | 0 | 0 | 0 | 0 |
| 51 | 0 | 0 | 0 | 0 |
| 52 | 0 | 0 | 0 | 0 |
| 53 | 0 | 0 | 0 | 0 |
| 54 | 0 | 0 | 0 | 0 |
| 55 | 0 | 0 | 0 | 0 |
| 56 [1] | 100 | 100 | 100 | 100 |
| 57 | 0 | 0 | 0 | 0 |
| 58 | 0 | 0 | 0 | 0 |
| 59 | 0 | 0 | 0 | 0 |
| 60 | 0 | 0 | 0 | 0 |
| 61 | 0 | 0 | 0 | 0 |
| 62 | 0 | 0 | 0 | 0 |
| 63 | 0 | 0 | 0 | 0 |
| 64 | 0 | 0 | 0 | 2 |
| 65 [1] | 100 | 100 | 100 | 100 |
| 66 [1] | 100 | 100 | 100 | 100 |
| 67 | 0 | 0 | 0 | 0 |
| 68 | 0 | 0 | 0 | 0 |
| 69 | 0 | 0 | 0 | 0 |
| 70 | 0 | 0 | 0 | 0 |
| 71 | 0 | 0 | 0 | 0 |
| 72 | 0 | 0 | 0 | 11 |
| 73 | 0 | 0 | 0 | 0 |
| MO [1] | 0 | 0 | 0 | 25 |

[1] Represents the compounds which are outside scope of invention.

EXPERIMENT 2

Tests for selective growth controlling effect between rice and barnyard grass were made by the following method.

Pots of 1/100 m.$^2$ were filled with soil and were supersaturated with water.

A specific amount of germinated rice seed and air-dried barnyard grass seed was sown into each pot and covered with soil. The germinated rice seed used in this test was prepared by soaking dried rice seed in water for germination, and, thereafter, selecting those seeds of the same germinated condition.

When the barnyard grass was grown to 1.5 leaves, water was poured into each pot to a depth of 4 cm. and an aqueous dispersion of one of the active ingredients of this invention was poured into the pot. Eighteen days after the treatment, the surviving rice plants and barnyard grass was taken up and weighed and air-dried.

TABLE II

| | | Amount of active ingredient (g./acre) | | |
|---|---|---|---|---|
| | | 1,600 | 800 | 400 |
| | Test plant | Degree of growth (percent) | | |
| Compound number: | | | | |
| 1 | Rice | 100 | 104 | 107 |
| | Barnyard grass | 0 | 0 | 9 |
| 2 | Rice | 63 | 79 | 77 |
| | Barnyard grass | 0 | 0 | 0 |
| 5 | Rice | 69 | 65 | 71 |
| | Barnyard grass | 0 | 0 | 0 |
| 7 | Rice | 89 | 89 | 94 |
| | Barnyard grass | 0 | 7 | 14 |
| 13 | Rice | 66 | 81 | 100 |
| | Barnyard grass | 1 | 10 | 11 |
| 15 | Rice | 77 | | 70 |
| | Barnyard grass | 0 | 0 | 0 |
| 19 | Rice | 100 | 88 | 95 |
| | Barnyard grass | 0 | 0 | 0 |
| 24 | Rice | 69 | 75 | 75 |
| | Barnyard grass | 3 | 3 | 7 |
| 26 | Rice | 82 | 71 | 73 |
| | Barnyard grass | 0 | 0 | 0 |
| 37 | Rice | 63 | 75 | 86 |
| | Barnyard grass | 0 | 0 | 0 |
| 50 | Rice | 93 | 88 | |
| | Barnyard grass | 0 | 7 | |
| 51 | Rice | | 68 | 68 |
| | Barnyard grass | | 0 | 0 |
| 52 | Rice | 71 | 64 | 75 |
| | Barnyard grass | 0 | 0 | 0 |
| 53 | Rice | 71 | 78 | 86 |
| | Barnyard grass | 0 | 0 | 7 |
| 61 | Rice | 113 | 111 | 101 |
| | Barnyard grass | 4 | 6 | 7 |
| 74 | Rice | 89 | 91 | 93 |
| | Barnyard grass | 6 | 7 | 9 |
| 63 | Rice | 77 | 85 | |
| | Barnyard grass | 0 | 6 | |
| 73 | Rice | 67 | 80 | 75 |
| | Barnyard grass | 0 | 11 | 10 |
| TOK [1] | Rice | 29 | 41 | 63 |
| | Barnyard grass | 0 | 0 | 0 |
| MO [1] | Rice | 73 | 70 | 89 |
| | Barnyard grass | 2 | 4 | 22 |

[1] Represents the references.

EXPERIMENT 3

Tests for herbicidal effect on the paddy field weeds were conducted as follows: Pots of 1/30 m.$^2$ were filled with soil and were supersaturated with water. Seed of Slender or Needle spikerush (*Eleocharis acicularis* ROEM et SCHULT) and seed of broad-leaved weeds of long steemed water-wort (*Elatine triandra* SCHK), Monochoria (*Monochoria vaginalis* PRESL), False pimpernel (*Lindernia procumbens* PHILCOX), Toothcup (*Rotala indica* KOEHNE) were placed into respective pots at a thickness of about 5 mm. Water was poured into each pot to a depth of 3 cm. After the weeds were emerged, an aqueous dispersion of each active ingredient of this invention was sprayed onto the weeds. Fourteen days after said treatment, each survival grass of said slender or needle spikerush and broad-leaved weeds was observed. The results are shown in Table III.

In Table III, the degree of growth control is stated under the following standards:

5: 100% growth suppression is found
4: About 90% growth suppression is found
3: About 70% growth suppression is found
2: About 50% growth suppression is found
1: About 30% growth suppression is found (in comparison with untreated ones)

TABLE III

| | Degree of growth control | | | | | |
|---|---|---|---|---|---|---|
| | Amount of active ingredient (g./acre) | | | | | |
| | 400 | | 200 | | 100 | |
| | Test plant | | | | | |
| | O | P | O | P | O | P |
| Compound number: | | | | | | |
| 1 | 5 | 5 | 5 | 5 | 5 | 5 |
| 2 | 5 | 5 | 5 | 5 | 4 | 5 |
| 5 | 5 | 5 | 5 | 5 | 5 | 5 |
| 6 | 5 | 5 | 4 | 4 | 4 | 4 |
| 15 | 5 | 5 | 5 | 5 | 4 | 5 |
| 16 | 5 | 5 | 4 | 5 | 4 | 5 |
| 19 | 5 | 5 | 5 | 5 | 5 | 5 |

TABLE III—Continued

| Compound number | Degree of growth control — Amount of active ingredient (g./acre) | | | | | |
|---|---|---|---|---|---|---|
| | 400 | | 200 | | 100 | |
| | O | P | O | P | O | P |
| 20 | 5 | 5 | 4 | 5 | 4 | 5 |
| 26 | 5 | 5 | 5 | 5 | 5 | 5 |
| 27 | 5 | 5 | 5 | 5 | 4 | 5 |
| 28 | 5 | 5 | 5 | 4 | 4 | 3 |
| 29 | 5 | 5 | 5 | 5 | 4 | 5 |
| 30 | 5 | 5 | 4 | 4 | 4 | 4 |
| 31 | 4 | 5 | 4 | 4 | 4 | 4 |
| 32 | 5 | 5 | 5 | 5 | 4 | 5 |
| 33 | 4 | 5 | 4 | 5 | 4 | 5 |
| 37 | 4 | 5 | 4 | 5 | 3 | 4 |
| 50 | 5 | 5 | 5 | 5 | 5 | 5 |
| 51 | 5 | 5 | 4 | 5 | 4 | 5 |
| 52 | 5 | 5 | 4 | 5 | 4 | 4 |
| 53 | 5 | 5 | 5 | 5 | 5 | 5 |
| 55 | 4 | 5 | 4 | 5 | 4 | 5 |
| 58 | 5 | 5 | 4 | 5 | 3 | 4 |
| 60 | 5 | 5 | 5 | 5 | 4 | 4 |
| 76 | 4 | 5 | 4 | 5 | 4 | 4 |
| 69 | 5 | 5 | 4 | 4 | 4 | 4 |
| 70 | 5 | 5 | 5 | 5 | 5 | 5 |
| MO [1] | 4 | 5 | 3 | 5 | 2 | 4 |

[1] Represents the references.
NOTE.—O = Slender or needle spikerush; P = Broad leaved weeds.

EXPERIMENT 4

Tests for herbicidal effect on the upland weeds in the green house were conducted as follows: Each pot of 1/30 m.$^2$ was filled with soil containing a general upland weed seed of Water foxtail (*Alopecurus aequalis* SOBOL var. *amurensis* OHWI)" Large crabgrass (*Digitaria adscendens* HENR) "Wavy bittercress (*Cardamine flexuosa* WITH) and maintained in upland condition.

The seeds of rice, radish and pea were sown in the pots and were covered with soil to a depth of about 1 cm. Three days after sowing, the specific amount of an aqueous dispersion of each ingredient was sprayed onto the soil. After fourteen days from said spraying, the growth condition of each of the rice, radish, pea and general upland weeds was observed. The results are shown in Table IV.

In the Table IV, the degree of growth control is stated using the following standards:

5: Complete growth suppression is found
4: Remarkable growth suppression is found
3: Clear growth suppression is found
2: Necrosis of leaves is found but disappears later
1: Same condition with untreated case

TABLE IV

| Compound number | Degree of growth control — Amount of active ingredients | | | | | | General upland weeds (g./acre) | |
|---|---|---|---|---|---|---|---|---|
| | Rice | | Radish | | Pea | | | |
| | 1,600 | 800 | 1,600 | 800 | 1,600 | 800 | 1,600 | 800 |
| 1 | 1-2 | 1 | 1 | 1 | 1 | 1 | 5 | 5 |
| 2 | 1-2 | 1-2 | 1 | 1 | 1 | 1 | 5 | 4 |
| 7 | 2 | 2 | 1-2 | 1 | 1 | 1 | 4 | 4 |
| 8 | 1 | 1 | 1 | 1 | 1 | 1 | 3 | 3 |
| 13 | 1 | 1 | 1 | 1 | 1 | 1 | 5-4 | 5-4 |
| 14 | 1 | 1 | 1 | 1 | 1 | 1 | 4 | 3 |
| 19 | 1 | 1 | 1 | 1 | 1 | 1 | 3 | 3 |
| 21 | 1 | 1 | 1 | 1 | 1 | 1 | 4 | 3 |
| 23 | 1 | 1 | 1 | 1 | 1 | 1 | 5 | 3 |
| 25 | 1 | 1 | 1 | 1 | 1 | 1 | 4-3 | 3 |
| 28 | 1 | 1 | 1 | 1 | 1 | 1 | 3 | 3 |
| 29 | 1 | 1 | 1 | 1 | 1 | 1 | 4 | 4 |
| 30 | 1 | 1 | 1 | 1 | 1 | 1 | 5-4 | 5-4 |
| 34 | 1 | 1 | 1 | 1 | 1 | 1 | 3 | 3 |
| 35 | 1 | 1 | 1 | 1 | 1 | 1 | 4 | 3 |
| 37 | 1-2 | 1 | 1 | 1 | 1 | 1 | 4-3 | 4-3 |
| 51 | 1-2 | 1 | 1-2 | 1 | 1 | 1 | 4 | 3 |
| 52 | 1-2 | 1 | 1 | 1 | 1 | — | 4 | 4 |
| 54 | 1 | 1 | 1 | 1 | 1 | 1 | 3 | 3 |
| 55 | 1 | 1 | 1 | 1 | 1 | 1 | 4 | 4 |
| 57 | 1 | 1 | 1 | 1 | 1 | 1 | 3 | 3 |
| 59 | 1 | 1 | 1 | 1 | 1 | 1 | 3 | 3 |
| 60 | 1 | 1 | 1 | 1 | 1 | 1 | 4 | 4 |
| 61 | 1 | 1 | 1 | 1 | 1 | 1 | 5 | 4 |
| 62 | 1 | 1 | 1 | 1 | 1 | 1 | 4 | 4 |
| 74 | 1 | 1 | 1 | 1 | 1 | 1 | 5-4 | 5-4 |
| 75 | 1 | 1 | 1 | 1 | 1 | 1 | 4 | 4 |
| 76 | 1 | 1 | 1 | 1 | 1 | 1 | 4 | 4 |
| 63 | 1 | 1 | 1 | 1 | 1 | 1 | 5 | 5 |
| 77 | 1 | 1 | 1 | 1 | 1 | 1 | 4 | 3 |
| 69 | 1 | 1 | 1 | 1 | 1 | 1 | 3 | 3 |
| 73 | 1 | 1 | 1 | 1 | 1 | 1 | 4 | 3 |

EXPERIMENT 5

Tests for herbicidal effect on the up-land weeds in the field condition were conducted as follows:

On each bed of about 60 cm. wide on the field growing Large crab-grass, of Wire grass (*Eleusine indica* GAERTN) and broad-leaved weeds of Lady's-thumb (*Polygonum persicaria* L), Common purslane (*Portulaca oleracea* L), two peanut seeds were sown at 20 cm. intervals and divided into each of 12 m.$^2$ (about 100 seeds in one block). After sowing the peanut seeds a specific concentration of an aqueous dispersion of each ingredient was sprayed onto the soil. Thirty days after spraying, the degree of chemical injury to the peanut was observed and those weeds which survived were taken up and weighed after air-drying (see Table V.).

The degree of growth was calculated as in Experiment 1.

TABLE V

| Compound number | Degree of growth, percent | | | | | | Degree of chemical injury |
|---|---|---|---|---|---|---|---|
| | Large crab-grass | | Wire grass | | Broad-leaved weeds | | |
| | Amount of active ingredients | | | | | | |
| | 1,600 g./acre | 800 g./acre | 1,600 g./acre | 800 g./acre | 1,600 g./acre | 800 g./acre | |
| 1 | 9.3 | 13.9 | 6.6 | 7.4 | 2.0 | 2.7 | None. |
| 2 | 3.5 | 8.1 | 1.9 | 12.0 | 2.0 | 2.7 | Do. |
| TOK | 29.0 | — | 31.5 | — | 6.7 | — | Do. |

EXPERIMENT 6

Comparative tests for the residual effect on paddy field were measured as follows: Pots of 1/50 m.$^2$ were filled with soil and water was poured to a depth of 3 cm. A specific concentration of aqueous dispersion of each ingredient was sprayed onto the soil. After a specified number of days after treatment, a specified amount of germinated barnyard grass were put in the depth of about 5 cm. Fourteen days after the treatment, the surviving barnyard grass was taken up, air dried and weighed. The degree of growth was calculated as in Experiment 1. The results are shown in Table VI wherein "Days" represents days after the spraying to the sowing. The germinated barnyard-grass seeds were prepared by soaking dried seeds.

TABLE VI

| Compound number | Amount of active ingredient (g./acre) | Degree of growth, percent | | | | |
|---|---|---|---|---|---|---|
| | | 3 days | 8 days | 15 days | 22 days | 29 days |
| 1 | 1,400 | 0 | 0 | 0 | 0 | 12 |
| | 1,600 | 0 | 0 | 0 | 0 | 16 |
| | 800 | 0 | 0 | 0 | 23 | 46 |
| 51 | 2,400 | 0 | 0 | 0 | 0 | 27 |
| | 1,600 | 0 | 0 | 0 | 6 | 24 |
| | 800 | 0 | 0 | 0 | 50 | 57 |
| TOK | 2,400 | 0 | 0 | 0 | 52 | 82 |
| | 1,600 | 0 | 0 | 11 | 52 | 71 |
| | 800 | 0 | 0 | 52 | 92 | 100 |
| MO | 2,400 | 0 | 0 | 16 | 57 | 100 |
| | 1,600 | 0 | 0 | 38 | 90 | 100 |
| | 800 | 0 | 0 | 46 | 100 | 100 |

EXPERIMENT 7

Comparative tests for the residual effect in upland condition were measured as follows: Pots of 1/100 m.$^2$ were filled with soil and a specific concentration of aqueous dispersion of each ingredient was sprayed at 1600 g./acre and water to super-saturation. After a specified number of days, water was filled to a depth of 1 cm. and the germinated barnyard-grass seeds were sown at a depth of about 5 mm. Fourteen days after sowing, the surviving weeds were taken up, air dried and weighed. The results are shown in Table VII, wherein the degree of growth is calculated as in Experiment 1. "Days" represents days after the spraying on the sown soil. The germinated barnyard-grass are same with that of Experiment 6.

TABLE VII

| | Degree of growth, percent | | | | |
|---|---|---|---|---|---|
| | 5 days | 10 days | 15 days | 25 days | 35 days |
| Compound number: | | | | | |
| 1 | 0 | 0 | 0 | 0 | 10.3 |
| 2 | 0 | 0 | 0 | 0 | 2.1 |
| TOK | 0 | 18 | 18 | 29 | 39 |
| MO | 9.1 | 20 | 24 | 46 | 69 |

As the results of said experiments, the novel compounds of this invention have excellent herbicidal properties and can be used in a wide variety of environments such as paddy fields, uplands, orchards, turves, woodlands, loadside, bank, railroad, play ground, lake-side, water supply, brook, etc.

The herbicides of this invention have the following various characteristic advantages as compared with conventional TOK, MO, etc.:

(1) They have remarkably good herbicidal properties against weeds in paddy fields, such as barnyard grass, etc. They can suppress said weeds with smaller amounts of ingredient. (Experiment 1.)

(2) The activity of the ingredients is high, even when diluted, so that they can be applied in low concentration. (Experiment 1).

(3) They have remarkably good selective growth control properties for herbicide barnyard grass (belonging to the same genus) without injury to rice. (Experiment 2.)

(4) They have remarkably good growth suppressing properties against slender or needle spikerush and broadleaved weeds such as Long stemmed water-wort, Monochoria, False Pimpernel, Toothcup, which are grown on wet or semi-wet ground. (Experiment 3.)

(5) They have growth suppressing effect against Water foxtail, Large crab-grass, Wavy bittercress, Wire grass, Lady's-thumb, Common purslane, however, they will not suppress the growth of rice, radish, pea or peanuts. (Experiments 4 and 5.)

(6) They exhibit remarkably good durability of growth suppressing effect, i.e., residual effect against weeds on wet ground as well as dry ground. (Experiments 6 and 7.)

The quantity of herbicide of this invention required depends upon the weather, soil, form of preparation of agent, season, method of application and weeds. Usually 100–4,000 g. per acre and preferably 200–2,400 g. per acre is effective. The herbicidal compounds of this invention can be applied in the form of an aqueous dispersion, a dust, a granule, a wettable powder, a water miscible solution or an emulsion with auxiliary agents such as diluent, solvent, emulsifier and spreader. The herbicidal compounds of this invention may be used together with other herbicidal compounds, insecticides, fungicides, fertilizers or soils. Sometimes, more effective results are obtained when applied in combination with such other materials.

The novel diphenylether of this invention may be synthesized by reacting an alkali metal salt of substituted phenol with 2-(OR-substituted)-4-halonitrobenzene. However, it is difficult to obtain high yields of the subject compound by said conventional processes, because a relatively large quantity of an isomer by-product is produced.

It has been discovered, and is another feature of this invention, that diphenylethers can be synthesized in high yields economically by reacting 2,4-dihalonitrobenzene having the general formula:

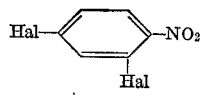

(II)

(wherein Hal is halogen atom) and a substituted phenol having the general formula:

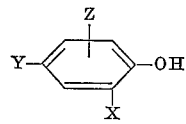

(III)

to produce a 2,4-bis-(substituted phenoxy)nitrobenzene having the general formula:

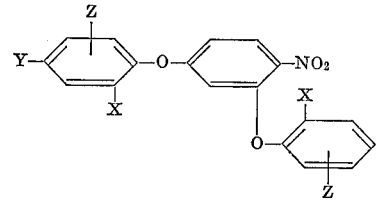

(IV)

This product is then reacted with a corresponding alcohol (ROH), R is corresponding to R defined in the formula (I), to produce the novel compound having general formula (I) and the substituted phenol having the general formula of (III) and the former product is isolated. A high yield of the novel diphenylether is easily obtained using this method. The bis-(substituted phenoxy) nitrobenzene (IV) is obtained preferably by the reaction of 1 mol of (II) and more than 2 mols of (III). Good results are obtained when the reaction occurs in the liquid phase and in a basic condition while heating. It is not always required to use a solvent, but it is possible to shorten the reaction time and obtain a more uniform reaction by using a suitable solvent.

The solvent should be inactive to the raw materials and alkali material. Suitable solvents include dioxane, isophorone, dimethylsulfoxide, dimethylacetoamide, and dimethylformamide as suitable ones.

In order to render the reaction media basic, an alkali metal hydroxide or carbonate may be added; such as, sodium hydroxide, potassium hydroxide or sodium carbonate. If desired, a solution of the alkali salt of substituted phenol of (III) can be used to render the reaction basic.

The reaction temperature for producing (IV) should be above 130° C., and preferably between 140–160° C. If the reaction temperature is too low, the speed of the reaction will be too slow. On the other hand, if the reaction temperature is too high, the resulting product may be colored and undesirable side reactions may occur.

The first reaction is usually completed in about 3–6 hours and provides bis-(substituted phenoxy)nitrobenzene of (IV) in high yield. This product can be used in the second reaction without purification or concentration, but it is also possible to use a purified bis-(substituted phenoxy)nitrobenzene.

The second reaction to produce 3'-(OR substituted)-4'-nitrodiphenylether from IV and ROH is also carried out in a basic condition while heating. It is unnecessary to add a solvent, except ROH, however, if desired another organic solvent can be added.

The alkali used in the second reaction may be the same as that used in the first reaction, or an alkolate produced by reacting ROH and an alkali can be used for this purpose. The temperature of the second reaction will depend upon the particular raw materials and the particular solvent and is usually 20–100° C.

The second reaction is usually completed within 2–4 hours. The resulting product is cooled and put into water to separate the solid product and then is purified to obtain a high yield of 3'-(OR-substituted)-4'-nitrodiphenylether. The substituted phenol (III) containing said resulting solution may be recovered and used for the first reaction.

The following is illustrative of the process for producing the novel diphenylethers of this invention.

EXAMPLE 1

810 grams (5 mol) of 2,4-dichlorophenol was placed into a 2 liter, four necked flask equipped with a stirrer, funnel and reflux condenser. The flask was heated to 120°–125° C. in an oil bath. 322 grams (4.8 mol) of potassium hydroxide was added to the flask and distilled, the resulting water in vacuum. The flask was then heated to 140° C. and 384 grams (2 mol) of 2,4-dichloronitrobenzene was added dropwise to the mixture over a period of thirty minutes. The reaction mixture was then heated to 140°–150° C. and maintained at this temperature for 4 hours. After the completion of the reaction was confirmed by gas-chromatography, the oil bath was removed and the temperature was lowered to 90°–95° C. One thousand ml. of dioxane was added to the flask and stirred after which a mixture of 200 ml. of methyl alcohol, and 150 grams of potassium hydroxide (2.3 mols) was also added. The temperature was maintained at 55° C.±5° C. for two hours. After completion of the reaction was confirmed by gas-chromatography, the contents of the flask were cooled to 30° C. and was placed into six liters of water while being subjected to severe stirring to separate a yellowish solid. The solid was filtered and washed in six liters of water, and refiltered and washed with one liter of ethyl alcohol. The solid filtrate was dried to obtain 622 grams of solid 2,4-dichloro-3'-methoxy-4'-nitrodiphenylether (m.p. 112°–114° C.). The yield of the product was 99%. In said process, 460 grams of 2,4-dichlorophenol was recovered by adding hydrochloride to the filtered solution. (Recovery was 95%.) Seven parts of 2,4-dichloro-3'-methoxy-4'-nitrodiphenylether, 88 parts of bentonite, 5 parts of sodium lignin sulfonate were mixed and granulated with a small amount of water to obtain a herbicide preparation. Ten kg./acre of the herbicide preparation was scattered over a paddy field and it was observed that all weeds were suppressed.

EXAMPLE 2

384 g. of 2,4-dichloronitrobenzene, 810 g. of 2,4-dichlorophenol and 322 g. of 85% of potassium hydroxide were reacted by the method according to Example 1, and 200 ml. of ethyl alcohol, 150 g. of potassium hydroxide and 100 ml. of dioxane were added and reacted to obtain 635 g. of 2,4-dichloro-3'-ethoxy-4'-nitrodiphenylether (m.p. 102°–104° C.). The yield of this product was 97%. 15 parts of 2,4-dichloro-3'-ethoxy-4'-nitrodiphenylether, 15 parts of polyoxyethylene stearate, 35 parts of isophorone and 35 parts of dioxane were uniformly mixed and dissolved to form a herbicide preparation (water miscible solution). By spraying 8 kg./acre of this herbicide preparation over a dry field, it was observed that all of the weeds were suppressed.

EXAMPLE 3

4.8 g. of 2,4-difluoronitrobenzene, 15.0 g. of 2,4,6-trichlorophenol. 4.7 g. of 85% potassium hydroxide and 30 ml. of dimethylsulfoxide as solvent, were reacted by the method of Example 1. 45 ml. of dioxane, 8.0 ml. of methyl alcohol and 3.0 g. of potassium hydroxide were added and reacted to obtain 9.0 g. of 2,4,6-trichloro-3'-methoxy-4'-nitrodiphenylether (m.p. 138°–140° C.). The yield of the product was 85%.

EXAMPLE 4

77 g. of 2,4-dichloronitrobenzene, 162 g. of 2,4-dichlorophenol and 65 g. of 85% KOH were reacted by the method of Example 1, except that a 1 liter, four-necked flask was used. 50 g. of methyl cellosolve, 35 g. of KOH and 200 ml. of dioxane were added to the flask and reacted to obtain 130 g. of 2,4-dichloro-3'-methoxyethoxy-4'-nitrodiphenylether (m.p. 62°–63° C.). The yield of the product was 91%.

EXAMPLE 5

77 g. of 2,4-dichloronitrobenzene, 143 g. of 22-chloro-4-methylphenol and 65 g. of KOH were reacted by the method of Example 1, except that a 1 liter, four-necked flask was used. 2-propnyl alcohol, 35 g. of KOH and 200 ml. of benzene were added to the flask and reacted to obtain 125 g. of 2-chloro-4-methyl-3'(2-propenyloxy)-4'-nitrodiphenylether (m.p. 57°–59° C.). The yield of the product was 92%.

EXAMPLE 6

40 parts of 2-chloro-4-methyl-3'-ethoxy-4'-nitrodiphenylether, 55 parts of kaolin, 5 parts of sodium alkylbenzene sulfonate were mixed and powdered to form a herbicide preparation. 3 kg./acre were sprayed on the wilds, and it was observed that all weeds were suppressed.

Having now fully described the invention, it will be apparent to one of ordinary skill in the art that many changes and modifications can be made thereto without departing from the spirit or scope of the invention.

Accordingly, what is claimed and intended to be covered by letters patent is:

1. A process for producing a diphenylether having the general formula:

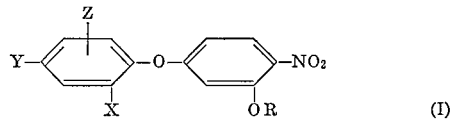

(I)

wherein X represents a halogen atom or a methyl radical in the 2-position; Y represents a halogen atom or an alkyl radical having up to 3 carbon atoms in the 4-position; Z represents hydrogen or halogen in the 5- and 6-positions, wherein both the 5- and 6-positions may be hydrogen, but only one of the 5- or 6-positions may be halogen; and R represents a saturated or an unsaturated hydrocarbon having up to 3 carbon atoms, methoxyethyl or an ethoxyethyl radical, which comprises reacting in the presence of an alkali metal hydroxide or carbonate a 2,4-dihalonitrobenzene having the general formula:

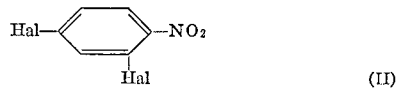

(II)

wherein Hal is a halogen atom, with a substituted phenol having the general formula:

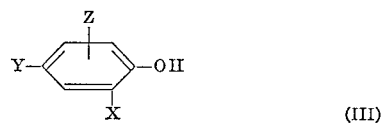

(III)

wherein the molar ratio of the phenol to the 2,4-dihalonitrobenzene is at least 2:1, at a temperature of from 130° C. to 160° C. to produce a 2,4-bis(substituted phenoxy) nitro benzene having the general formula:

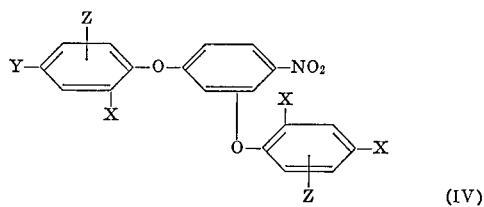

(IV)

then reacting said 2,4-bis(substituted phenoxy) nitrobenzene (IV) in the presence of an alkali metal hydroxide with an alcohol of the formula ROH wherein R is as defined above at a temperature of 20–100° C. to produce said diphenylether (I) and a substituted phenol (III) and thereafter isolating said diphenylether (I).

2. The process of claim 1, wherein the first reaction and the second reaction are each conducted in the presence of an organic solvent.

3. The process of claim 1, wherein the substituted phenol (III) obtained by the second step reaction is recovered and reused in the first step reaction.

the second reaction are each conducted in the presence of an alkali metal hydroxide.

4. The process of claim 1, wherein the first reaction and

5. The process of claim 1, wherein the first and second reactions are conducted in the presence of an organic solvent selected from the group consisting of dioxane, isophorone, dimethylsulfoxide, dimethylacetoamide and dimethylformamide.

6. The process of claim 4, wherein the alkaline metal hydroxide is potassium hydroxide.

References Cited

UNITED STATES PATENTS

| | | | |
|---|---|---|---|
| 2,141,667 | 12/1938 | Petitcolas | 260—613 R |
| 3,506,720 | 4/1970 | Model et al. | 260—613 R |
| 3,637,867 | 1/1972 | Clark et al. | 260—613 D |

HOWARD T. MARS, Primary Examiner

N. CHAN, Assistant Examiner

U.S. Cl. X.R.

71—124